Patented June 8, 1954

2,680,768

UNITED STATES PATENT OFFICE 2,680,768

PRODUCTION OF PANTETHEINE AND PANTETHINE

Esmond E. Snell, Austin, Tex., and Eugene L. Wittle and James A. Moore, Detroit, Mich., assignors to Parke, Davis & Company, Detroit, Mich., a corporation of Michigan No Drawing. Application September 18, 1952, Serial No. 310,362

7 Claims. (Cl. 260—561)

This application is a continuation-in-part of our copending application Serial Number 191,936, filed October 24, 1950, and the invention relates to a process for the production of organic sulfur compounds. More particularly, the invention relates to a process for the production of bis[N-(+)-pantothenyl-2-aminoethyl]disulfide (pantethine) and N-(+)-pantothenyl-2-aminoethyl mercaptan (pantetheine).

In accordance with the invention, pantethine and pantetheine are produced by condensing (—)-pantolactone with bis[N-(β-alanyl)-2-aminoethyl]disulfide and N-(β-alanyl)-2-aminoethyl mercaptan, respectively. The transformations involved can be represented diagrammatically as follows:

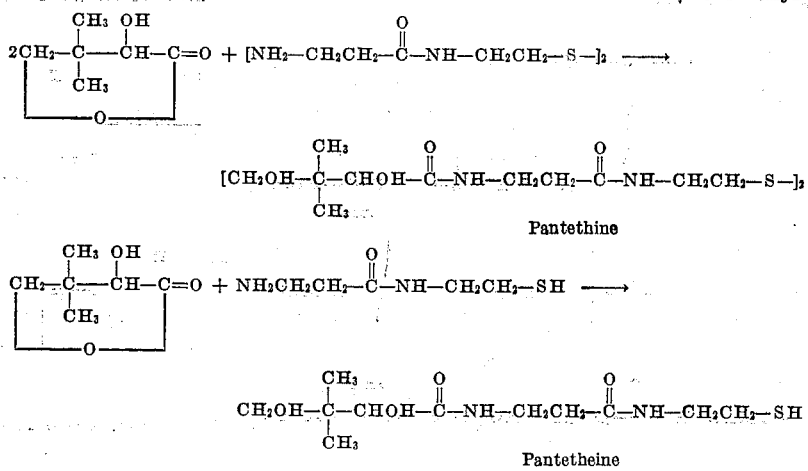

The bis[N-(β-alanyl)-2-aminoethyl]disulfide and N-(β-alanyl)-2-aminoethyl mercaptan starting materials can be used in either the free base or acid addition salt form. When an acid addition salt is used an equivalent amount of an alkaline material such as an alkali or alkaline earth metal hydroxide or alcoholate is added to the reaction mixture to liberate the free amine in situ.

The products produced by the process of the present invention, that is, pantethine and pantetheine, are growth factors for microorganisms of the Lactobacillus genus and are capable of correcting pantothenic acid deficiencies in animals.

The β-thioethyl amide of β-alanine and the corresponding disulfide used as starting materials can be prepared in several ways. For instance, they may be prepared by condensing ethyl carbobenzoxy-β-alanate or carbobenzoxy-β-alanyl chloride with β-mercaptoethylamine or bis(β-aminoethyl) disulfide and treating the reaction product with phosphonium iodide to split off the carbobenzoxy group. These starting materials can also be prepared by treating N-(N-carbobenzoxy-β-alanyl)-2-aminoethanol with phosphorus pentasulfide and then splitting off the carbobenzoxy group by treatment with phosphonium iodide. The β-thioethyl amide of β-alanine so obtained can be converted to the disulfide by oxidation with air, hydrogen peroxide or iodine. Alternatively, the mercaptan can be oxidized before the carbobenzoxy group is split off.

The condensation can be carried out in the presence or absence of a solvent. As solvents, water, lower aliphatic alcohols, hydrocarbons, lower aliphatic ethers and mixtures of the same can be used. Best results are obtained using substantially anhydrous lower aliphatic alcohols as solvents and a reaction temperature of 20 to 100° C.

The relative quantities of the two reactants are not particularly critical, but in most instances it is preferable to use a slight excess of the (—)-pantolactone. When the reaction is carried out with bis-(N-(β-alanyl)-2-aminoethyl)disulfide at least two equivalents of the (—)-pantolactone are used for each equivalent of the disulfide while only one equivalent of the (—)-pantolactone is required per equivalent of mercaptan when carrying out the process with N-(β-alanyl)-2-aminoethyl mercaptan.

The invention is illustrated by the following examples.

Example 1

10.2 cc. of 0.98 N sodium methoxide in methanol is added to 1.84 g. of bis[N-(β-alanyl)-2-aminoethyl]disulfide dihydrochloride in 15 cc. of methanol, the mixture diluted with an equal volume of ether and the sodium chloride removed by filtration. The solvents are evaporated from the filtrate and 1.3 g. of (—)-pantolactone added to the residual bis[N-(β-alanyl)-2-aminoethyl]-disulfide. The mixture is heated at 60° C. for one hour, cooled and dissolved in 1.5 cc. of methanol. The solution is diluted with 100 cc. of anhydrous ether and the oil which separates collected. The oil is again dissolved in methanol and precipitated with ether and then placed under vacuo in a vacuum desiccator. The tan hydroscopic solid, 1.1 g., so obtained is practically pure pantethine [bis(N - (+) - pantothenyl - 2-aminoethyl) disulfide].

Example 2

15 g. of (—)-pantolactone and a solution of 2.3 g. of sodium dissolved in 50 cc. of methanol are added to 18.4 g. of bis[N-(β-alanyl)-2-amino-ethyl]disulfide dihydrochloride in 150 cc. of methanol and the solution allowed to stand at 25° C. for sixty hours. The reaction mixture is filtered and the solvents evaporated from the filtrate to obtain 25 g. of an oily solid which solidifies on standing in a vacuum desiccator. The product thus obtained is 70 to 75% pure panethine by microbiological assay. This product can be purified further as described in Example 1.

Example 3

4.1 cc. of a 0.98 N solution of sodium methylate in methanol is added to a mixture consisting of 912 mg. of bis[N-(β-alanyl)-2-aminoethyl]disulfide dihydrobromide and 500 mg. of (—)-pantolactone in 20 cc. of methanol. The reaction mixture is allowed to stand at 25° C. for forty-eight hours and then heated to boiling for five minutes. The solvents are evaporated in vacuo and the residual pantethine purified as described in Example 1.

Example 4

A mixture consisting of 164 mg. of N-(β-alanyl)-2-aminoethyl mercaptan and 144 mg. of (—)-pantolactone in 1.8 cc. of methanol is allowed to stand at 25° C. for twenty-four hours and then heated to 50° C. for one-half hour. The solution is evaporated to dryness in a current of nitrogen to obtain 200 mg. of pantetheine as a clear oil. The product so obtained is 75% pure by microbiological assay.

What we claim is:

1. Process for the production of a compound of the class consisting of bis[N-(+)-pantothenyl-2-aminoethyl]-disulfide and N-(+)-pantothenyl-2-aminoethyl mercaptan which comprises condensing respectively a member of the class consisting of bis-[N-(β-alanyl)-2-aminoethyl]disulfide and N-(β-alanyl)-2-aminoethyl mercaptan with (—)-pantolactone.

2. Process for the production of bis-[N-(+)-pantothenyl-2-aminoethyl]disulfide which comprises condensing bis[N-(β-alanyl)-2-aminoethyl]disulfide with at least two equivalents of (—)-pantolactone.

3. Process for the production of bis[N-(+)-pantothenyl-2-aminoethyl]disulfide which comprises condensing bis[N-(β-alanyl)-2-aminoethyl]disulfide with at least two equivalents of (—)-pantolactone in an anhydrous lower aliphatic alcohol at a temperature between 20 and 100° C.

4. Process for the production of N-(+)-pantothenyl-2-aminoethyl mercaptan which comprises condensing N-(β-alanyl)-2-aminoethyl mercaptan with (—)-pantolactone.

5. Process for the production of N-(+)-pantothenyl-2-aminoethyl mercaptan which comprises condensing N-(β-alanyl)-2-aminoethyl mercaptan with (—)-pantolactone in an anhydrous lower aliphatic alcohol at a temperature between 20 and 100° C.

6. Process of claim 2 in which bis-[N-(+)-pantothenyl-2-aminoethyl]disulfide is provided in situ by adding an equivalent of an alkaline alcoholate to an acid addition salt thereof.

7. Process of claim 4 in which N-(β-alanyl)-2-aminoethyl mercaptan is provided in situ by adding an equivalent of an alkaline alcoholate to an acid addition salt thereof.

References Cited in the file of this patent

UNITED STATES PATENTS

| Number | Name | Date |
| --- | --- | --- |
| 2,377,105 | Reichstein | May 29, 1945 |
| 2,413,077 | Schnider | Dec. 24, 1946 |

FOREIGN PATENTS

| Number | Country | Date |
| --- | --- | --- |
| 568,355 | Great Britain | Mar. 30, 1945 |
| 943,459 | France | Oct. 4, 1948 |

OTHER REFERENCES

Barnett: "J. Chem. Soc." (London), 1944, pp. 5 to 8.